(No Model.)
H. S. MAXIM.
INCANDESCENT ELECTRIC LAMP.
No. 247,084. Patented Sept. 13, 1881.
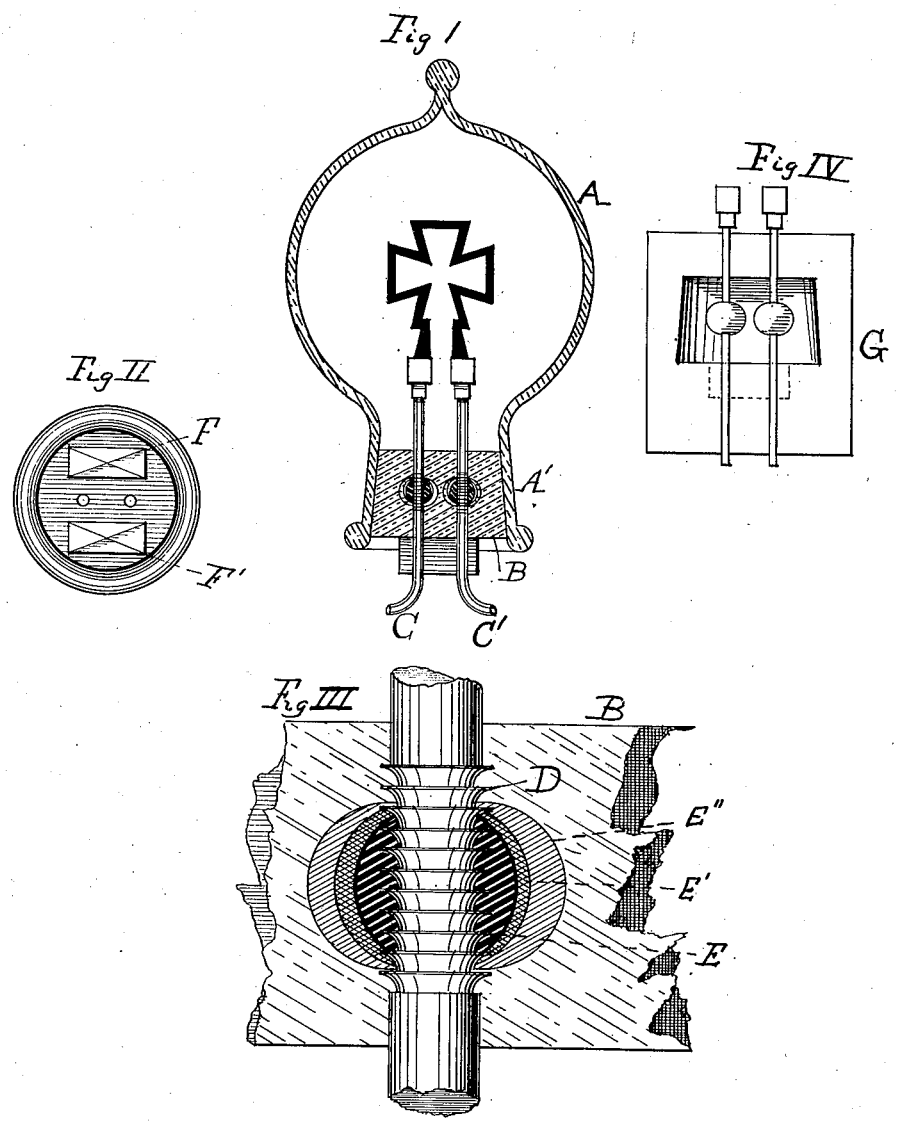
Witnesses:—
Inventor:—
Hiram S. Maxim

UNITED STATES PATENT OFFICE.

HIRAM S. MAXIM, OF BROOKLYN, ASSIGNOR TO THE UNITED STATES ELECTRIC LIGHTING COMPANY, OF NEW YORK, N. Y.

INCANDESCENT ELECTRIC LAMP.

SPECIFICATION forming part of Letters Patent No. 247,084, dated September 13, 1881.

Application filed April 25, 1881. (No model.)

*To all whom it may concern:*

Be it known that I, HIRAM S. MAXIM, of the city of Brooklyn, in the county of Kings and State of New York, have invented certain new and useful Improvements in Incandescent Electric Lamps, of which the following is a specification, reference being had to the drawings accompanying and forming a part of the same.

My invention relates to incandescent electric lamps in which the metallic conductors for conveying the current to and through the carbon strip or filament are passed through a solid stopper or plug which fits into the open neck of the exhausted receiver by a ground-glass joint.

The object of my present invention is to improve the methods heretofore described by me in other applications for the substitution for the expensive platinum conductors usually employed of wires of copper, or a metal to which glass does not readily adhere, to form a perfectly-tight joint. This has heretofore been the most serious difficulty encountered in the manufacture of this class of lamps.

By my present invention I entirely overcome these objections and afford a practicable method of utilizing copper conducting-wires, thus producing an efficient and serviceable lamp at greatly-reduced cost.

In carrying out my invention I make use of rods or short lengths of copper wire, and in these I form a number of circular grooves or threads, either by cutting them out or turning them up. Around these threaded portions, when properly cleaned, a small quantity of vitreous cement, or a composition of potash, silica, and the oxides of iron and copper, is caused to adhere, while hot, about which, when hard, a second layer of the same material, but containing a smaller proportion of metal, is formed, and then over this a third layer is formed, of nearly pure glass. The wires, with their adhering masses of cement, are then laid in a mold and a glass plug or stopper formed about them, which is ground to fit the open neck of the lamp-globe. The whole is completed by the addition of the carbon conductors and the exhaustion of the globe, in the usual manner.

In the accompanying drawings, Figure I is a central sectional view of the lamp complete; Fig. II, a plan view of the under side of the stopper; Fig. III, a sectional view of the stopper, showing the adhering mass of cement formed in successive layers; and Fig. IV, an illustration of the method of forming the plugs or stoppers about the wires.

The rods or wires of copper C C' are milled or cut with spiral or parallel threads along a portion of their length, as shown at D, around which a small quantity of vitreous cement, E, containing in its composition sufficient metallic oxide to cause it to adhere to copper, is wound while hot. Over this a second layer, E', is formed, in which the proportion of metal is less than in E, and, finally, a third layer, E'', is added, containing a still smaller proportion of metal. The purpose of the several layers is to form an absolutely air-tight connection between the copper wires and the glass plug, for the pure glass adheres the more readily to the vitreous cement as the proportion of metallic oxides contained in the latter is lessened, and the converse is true of the copper and the cement. The wires C C', with the adhering masses of cement, are then laid across the center of a circular mold, G, and a stopper, B, formed around them, from which project two or more lugs, F F', on the under side, to facilitate the manipulation of the stoppers in grinding them or in removing the same from the neck of the globe. The stoppers, when molded, are ground, and completed by the addition of the carbons, and the whole inserted in the open neck of the globe, either with or without a sealing substance to insure a tight joint. The globes are exhausted and sealed in the usual way, and the exterior conductors secured in any suitable manner to make contact with the terminals of the line contained in the socket or holder.

Having thus described my invention, what I claim as new, and desire to secure by Letters Patent, is—

1. The method of sealing wires in glass, which consists in surrounding them previously to inclosing them in the glass with a mass of metallo-vitreous cement composed of several layers, each one containing a greater proportion of metal in its composition than that of the layer surrounding it, substantially as and for the purpose set forth.

2. In an electric incandescent lamp, the combination, with the glass inclosing-globe, of a ground stopper, B, composed of a body of glass, containing the conductors C C', threaded or grooved, as described, and surrounded with a mass of metallo-vitreous cement, substantially as described.

In testimony whereof I have hereunto set my hand this 22d day of April, 1881.

HIRAM S. MAXIM.

Witnesses:
WM. A. BARNES,
WILLIAM STANLEY, Jr.